United States Patent

[11] 3,599,260

[72] Inventor Raymond L. Lesh
1740 Berry Road, Independence, Mo. 64057
[21] Appl. No. 764,829
[22] Filed Oct. 3, 1968
[45] Patented Aug. 17, 1971

[54] THREADING CHUCK
6 Claims, 12 Drawing Figs.

[52] U.S. Cl. .................................................. 10/89,
10/129, 10/135, 10/141
[51] Int. Cl. .................................................. B23g 1/00,
B23g 5/06, B23g 5/14
[50] Field of Search ........................................ 10/89, 89 F,
89 H, 129, 129 P, 141, 141 H, 135

[56] References Cited
UNITED STATES PATENTS
974,239  11/1910  Dalton ........................ 10/89
1,974,345  9/1934  Scholtes ...................... 10/89
2,244,143  6/1941  Dowler ....................... 10/135
2,540,513  2/1951  Dodd .......................... 10/135
2,606,431  8/1952  Elgin .......................... 10/135
2,729,076  1/1956  Thomson ..................... 10/135
3,214,773  11/1965  Benjamin et al. ............ 10/135

FOREIGN PATENTS
133,133  9/1919  Great Britain ............... 10/89
350,516  6/1931  Great Britain ............... 10/89
663,102  12/1951  Great Britain ............... 10/89

Primary Examiner—Charles W. Lanham
Assistant Examiner—E. M. Combs
Attorney—Schmidt, Johnson, Hovey & Williams ABSTRACT: A threading chuck for use with a machine tool has a pair of relatively rotatable, coaxial elements, one of the elements having a threading tool secured thereto. The other element is mounted on the work axis of the machine. A clutch is interposed between the elements and is adapted, when engaged, to hold the elements against relative rotation. However, when the clutch is released, the element carrying the threading tool is permitted to rotate relative to the other element, thereby discontinuing the threading operation.

PATENTED AUG 17 1971
3,599,260
SHEET 1 OF 2
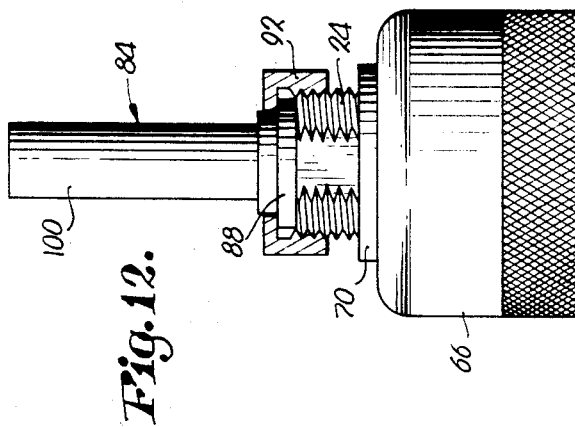
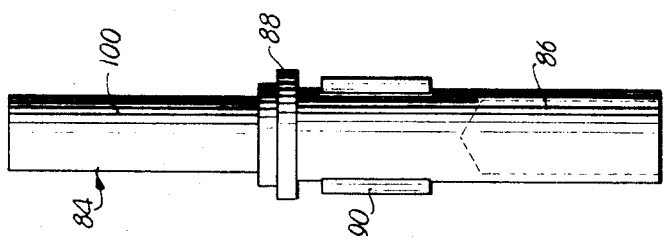
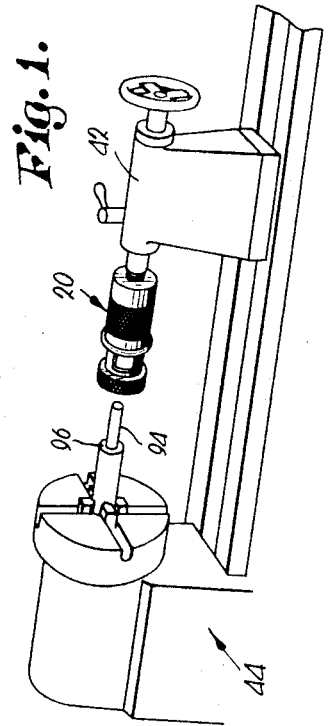
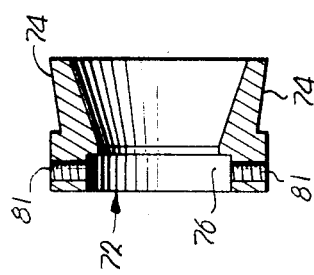
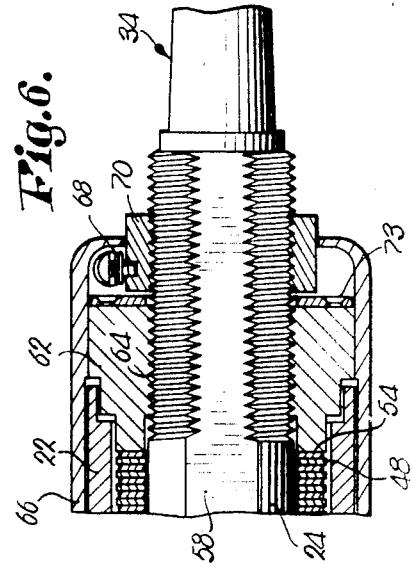
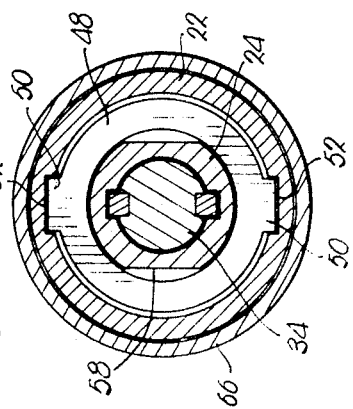
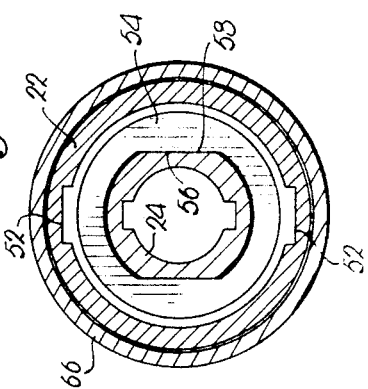
INVENTOR
Raymond L. Lesh
BY Schmidt, Johnson, Hovey,
Williams & Bradley,
ATTORNEYS.

PATENTED AUG 1 7 1971
3,599,260
SHEET 2 OF 2
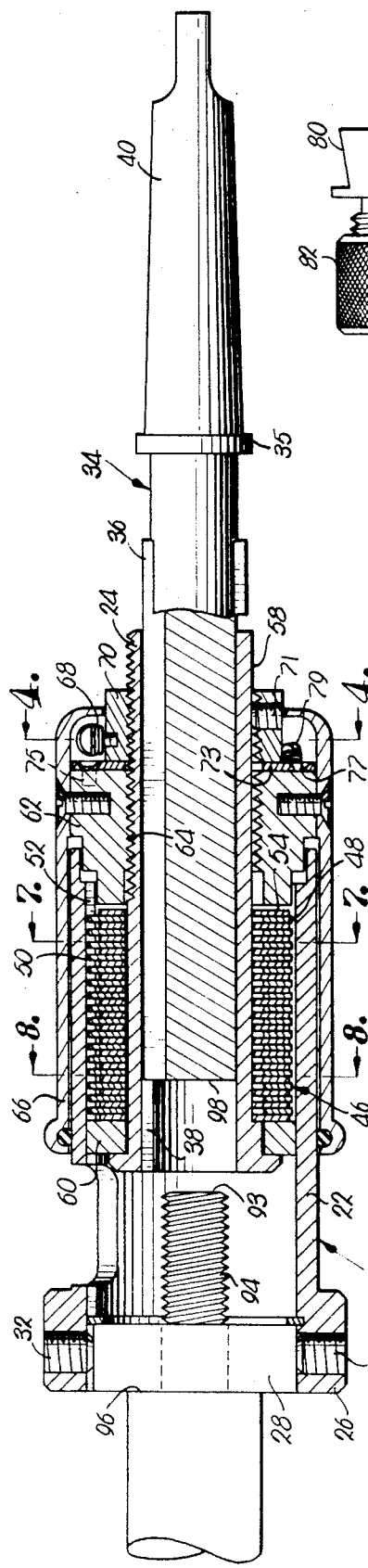
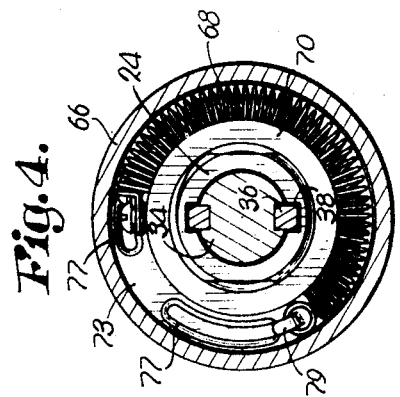
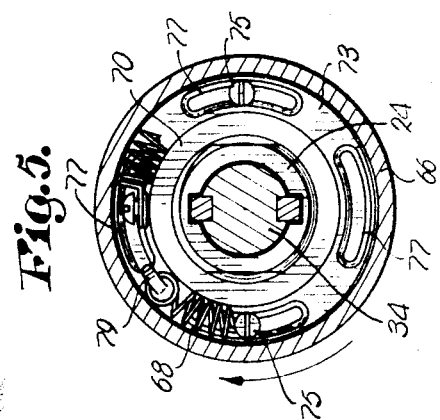
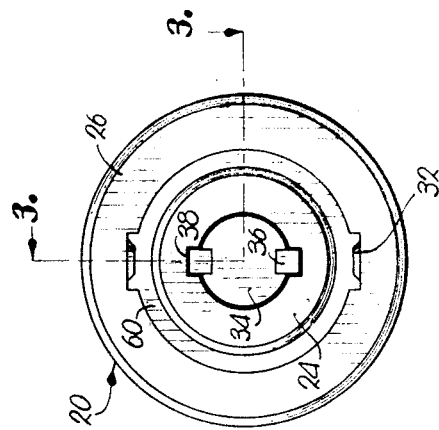
INVENTOR
Raymond L. Lesh
BY Schmidt, Johnson, Hovey,
Williams & Bradley.
ATTORNEYS.

THREADING CHUCK

This invention relates to a threading chuck for use with a machine tool.

When fabricating material, it is often desirable to form exterior threads on cylindrical elements at a point in close proximity to a shoulder. However, this has not heretofore been practical without ruining the workpiece, or in certain instances, the machine itself since, in prior art devices, there is no way to quickly discontinue the threading operation when the threading die engages the shoulder. Former devices rely upon the operator to stop power to the machine as the tool approaches the shoulder but this is unsatisfactory because it is very difficult to disconnect the machine at exactly the right moment. Furthermore, a member must often be threaded over a specified length which is also very difficult to accomplish using prior art devices since, as discussed above, the only way to stop the threading operation is to disconnect power to the machine.

Threading blind openings is also troublesome using heretofore available devices if the entire extent of the opening is to be threaded since the operator must discontinue power to the machine precisely at the instant that the tap reaches the bottom of the opening.

It is, therefore, an important object of this invention to provide a device for holding a threading tool that can be quickly and easily mounted on the work axis of existing machine tools.

Another important object of this invention is to provide a device enabling the operator to have better control over the threading operation, enabling the threads to be started and discontinued as desired.

Still another important object of this invention is to enable blind openings to be tapped throughout their entire length up to a shoulder with a member of larger diameter.

Another important object of this invention is to provide a device that is able to accurately gauge and control the length of threads being turned on the workpiece. In the drawings:

FIG. 1 illustrates the threading chuck of my present invention mounted on the work axis of an engine lathe;

FIG. 2 is a front elevational view of the chuck of FIG. 1;

FIG. 3 is a cross-sectional view taken along line 3-3 of FIG. 2;

FIGS. 4, 7 and 8 are cross-sectional views taken along lines 4-4, 7-7 and 8-8 respectively of FIG. 3;

FIGS. 5 and 6 are views similar to FIGS. 3 and 4 respectively, but showing the threading chuck with the clutch thereof engaged;

FIG. 9 illustrates a tapping tool for use with my threading chuck;

FIG. 10 illustrates an adapter for use with my invention that enables a smaller threading die to be used with my chuck than that illustrated in FIG. 3;

FIG. 11 is a view illustrating a shank for use with my threading chuck; and

FIG. 12 illustrates the shank of FIG. 11 in use with my threading chuck.

Referring to FIGS. 2—8, a threading chuck 20 has a pair of relatively rotatable, coaxial, sleevelike elements 22 and 24. Element 22 has a toll holder 26 mounted on one end thereof for receiving and supporting a threading tool such as the die 28 of FIG. 3 or the tap 30 of FIG. 9. Threading tools 28 and 30 are retained in place in the holder 26 by setscrews 32.

Element 24 has a shank 34 inserted therein having keys 36 engaging mating channels 38 in the element 24, thereby holding the shank 34 against rotation relative to the element 24, but permitting chuck 20 to slide along shank 34. The end 40 of shank 34 is adapted to be mounted in a tailstock 42 of an engine lathe 44 as illustrated in FIG. 1. Shank 34 is a solid bar having an enlargement or stop 35 thereon.

A clutch 46 is interposed between the elements 22 and 24 and is adapted, when engaged, to hold the elements against relative rotation. Clutch 46 includes a first set of discs 48 coaxial with the elements 22 and 24, having keys 50 engaging corresponding channels 52 in the element 22. Keys 50 prevent the discs 48 from rotating relative to the element 22, but permit the discs to slide axially therealong. A second set of discs 54 are rotatable relative to the element 22 but are flattened at 56 to engage corresponding flattened portions 58 on the elements 24. The engagement of the flats 56 with the flat portions 58 prevents the discs 54 from rotating relative to the element 24, but permits them to slide axially therealong. Discs 48 and 54 are interposed between a bearing ring 60 carried by element 22 and a nut 62 carried by the element 24. Threads 64 on the nut 62 are in mesh with corresponding threads on the element 24, enabling nut 62 to be moved along element 24 toward and away form the ring 60. A tubular member 66 is secured to the nut 62 for rotating the latter. Nut 62 is yieldably biased away from the ring 60 by the resilient member or spring 68 which interconnects the nut 62 and a collar 70 rigidly secured to the element 24 by one or more setscrews 71.

Spring 68 is secured to nut 62 through an adjusting washer 73. Screws 75 extend through arcuate slots 77 on washer 73 and into the nut 62. One end of the spring 68 is received by a hook 79 on the washer 73, the other end of the spring being fastened to the collar 70. Upon assembly of the chuck 20, tension in spring 68 may be adjusted by rotating washer 73 relative to the nut 62 and then tightening screws 75 to hold the washer in position.

In FIG. 10 an adapter piece 72 is illustrated that enables a threading die (not shown) smaller than the die 28 illustrated in FIG. 3 to be used with the threading chuck 20. Setscrews 32 engage the corresponding flats 74 in the adapter 72 to hold the same in the tool holder 26. The smaller threading die (not shown) can be inserted in the opening 76 of the adapter 72 and setscrews 81 tightened against the die to hold the same in place.

Tap 30 is held in a chuck 78 which is inserted in the tool holder 26, the setscrews 32 being tightened against a pair of flats 80 to hold the chuck 78 in place. An adjustable cap 82 on the chuck 78 permits a different sized tap (not shown) to be inserted therein.

Referring now to FIGS. 11 and 12, a shank 84 is illustrated that may be used in the threading chuck 20 interchangeably with the shank 34 and enables the threading chuck to be used with a turret lathe or with a machine tool having a vertical work axis, such as a drill press or a vertical milling machine. Shank 84 has an interior bore 86, an enlarged portion 88, and has keys 90 that engage the channels 38 in element 24. A cap 92 has interior threads that mesh with the threads on the element 24 and holds the enlarged portion 88 of shank 84 tightly against one end of the element 24.

In operation, end 40 of shank 34 is mounted in the tailstock 42 of an engine lathe, and the threading chuck 20 is inserted thereupon. Tailstock 42 is moved forwardly until the threading tool 28 secured in the holder 26 is in a disposition adjacent the outer end 93 of a workpiece 94 to be threaded. The operator then grasps the knurled tubular member 66 and twists the same in a direction causing the nut 62 secured thereto to rotate on the element 24 in a direction toward the bearing ring 60. Nut 62 engages the clutch 46 by forcing the discs 48 and 54 against each other and against the ring 60. Since the discs 48 alternate with the discs 54, when the nut 62 moves the discs together, the same will frictionally engage with each other thereby holding element 22 against rotation relative to the element 24. The operator then slides the threading chuck 20 along the shank 34 while holding the sleeve 66 in the rotated position until the chuck 20 engages the front end of the workpiece 94 and begins to produce threads thereon.

After a few threads are cut on the workpiece 94 the interaction of the die with the workpiece will automatically slide the chuck 20 along the shank 34 as long as the operator maintains the member 66 in a rotated position. If at any time during the threading operation it is desirable to cease producing threads on the workpiece the operator merely releases the member 66, at which time the spring 68 rotates the nut 62 away from the ring 60, thereby permitting the discs 48 and 54 to rotate relative to each other. Upon disengagement of the clutch 46, element 22 will rotate with the workpiece relative to the element 24 which is held against rotation by the shank 34. When the threads being produced on the workpiece 94 reach the shoulder 96, the operator may release the tubular member 66, thereby disengaging the clutch and discontinuing the threading operation. However, even if the operator continues to hold the member 66 in a position engaging the clutch 46, the additional force of the shoulder acting against the front face of the threading chuck 20 will overcome the frictional force locking the discs 48 and 54 together. Thus, the threading operation is automatically discontinued before the workpiece or the lathe is damaged.

Indicia (not shown) may be placed along the keyed portion of the shank 34 to enable the operator to measure the length of the threads that he is producing on the workpiece. Before the threading operation begins, the tailstock 42 is moved to a position where the end 98 of shank 34 engages the die 28. Then, as the threading operation proceeds and the threading chuck 20 is moved along the shank 34, indicia on the shank 34 will be exposed to indicate the length of threads that have been produced on the workpiece.

Use of shank 84 with the threading chuck 20 permits the same to be used with a turret lathe, drill press, or a vertical milling machine. Shank 84 is inserted into the element 24 and the cap 92 locks shank 84 against axial movement relative to element 24. The shank end 100 can then be locked in the spindle of a drill press or vertical milling machine, or in the tailstock turret of a lather. As the chuck 20 is lowered against the workpiece, the upwardly acting force of the workpiece against the tool holder 26 will force the ring 60 carried by the element 22 into engagement with the first of the discs 48 or 54. Further downward movement will force the discs 48 and 54 against the nut 62 and against each other, thereby holding the element 22 against rotation relative the the element 24. Since the threading chuck 20 is being rotated in the spindle of the drill press or vertical milling machine, threads will be produced on the workpiece. When it is desirable to cease producing threads, the operator merely releases the pressure on the spindle, thereby releasing the clutch 46 and permitting the element 24 to turn relative to the element 22. If the threading tool 28 engages a shoulder on the workpiece, the twisting force produced thereby will overcome the frictional force between the discs 48 and 54 thus permitting element 22 to rotate relative to the element 24 whether or not the pressure on the headstock is also released. If a relatively long workpiece is to be threaded, the threaded portion of the workpiece is received in the bore 86 of shank 84. However, if a relatively short workpiece is to be threaded, a solid shank, such as the shank 34, may be used in place of the shank 84. Also, the shank 84 may be used with the threading chuck 20 if the same is to be mounted in the tailstock of a lathe, but since the key 90 is in the shank 84 is relatively short, the tailstock must be continually advanced along the lather bed as the threading operation progresses.

Although the operation of the threading chuck has been described using a die for producing external threads on a workpiece, a bore may be threaded by using the tap 30 and chuck 78 in place of the die 28. Upon engagement of the tap 30 with the bottom of a bore, the clutch 46 will be disengaged in a manner identical to that described above when the die 28 engages a shoulder on a workpiece.

Thus, it can be seen that the threading chuck described above enables the workpiece to be threaded over a particular length or up to a shoulder. The threading chuck 20 enables the workman to have precise control over the threading operation and enables him to stop and start threads as he wishes. The invention therefore provides a device that not only is highly useful but is also easily adaptable for use in existing machine tools and may be quickly and easily removed and inserted thereupon.

Having thus described the invention, what I claim as new and desired to be secured by Letters Patent is:

1. In a device of the kind described;
a pair of relatively rotatable, coaxial elements;
a clutch interposed between the elements, and adapted when engaged to interconnect the elements for rotation together as a unit;
structure shiftably carried by one of said elements for movement to and from a position effecting engagement of said clutch;
a tubular member freely rotatable on the other of said elements and connected with said structure for shifting the latter toward and away from a position to effect engagement of the clutch; and
a resilient member interconnecting said structure with said one element,
said member yieldably biasing said structure away from the position effecting engagement of the clutch.

2. In a device of the kind described;
a pair of relatively rotatable, coaxial elements;
a clutch interposed between the elements, and adapted when engaged to interconnect the elements for rotation between as a unit,
structure shiftably carried by one of said elements for movement to and from a position effecting engagement of said clutch;
a tubular member freely rotatable on the other of said elements and connected with said structure for shifting the latter toward and away from a position to effect engagement of the clutch,
said clutch including a first set of discs held for rotation with said one element and a second set of discs held for rotation with the other of said elements the discs of the first set being alternately spaced with the discs of the second set,
each of said discs being slidable axially along the elements;
a bearing ring carried by said other element,
said structure including a nut on said one element movable toward and away from said ring,
there being screw threads son said one element in mesh with the threads on the nut,
said discs being interposed between said nut and said ring whereby, upon movement of the nut toward said ring, the discs of the first set will be forced against corresponding discs of the second set to lock the elements against relative rotation;
a collar secured to said one element; and
a resilient member interconnecting the nut and the collar for yieldably biasing said nut away from said ring.

3. A chuck comprising:
a shank adapted to be held against rotation and against axial movement;
a first element shiftably carried by said shank for free, unrestricted movement longitudinally on the shank in either direction;
means interconnecting said shank and said first element for preventing rotation of the latter relative to the shank;
a second element coaxially carried by said first element for movement with the latter along the shank and for rotation of the second element about said axis relative to said first element;
tool-holding means on said second element adapted for carrying a tool to be used on a rotating work product;
a clutch interposed between the elements and adapted when engaged to interconnect the elements to resist said rotation of the second element with the work product to an extent to permit machining of said rotating product as the elements advance along the shank as a unit in one direction of movement thereof; and
manually operable structure on said first element freely shiftable into and out of a position effecting engagement of said clutch while said second element is rotating with the product for controlling the rotation of said second element.

4. A chuck as claimed in claim 3, wherein is provided a bearing member on said first element remote from said structure for facilitating said rotation of the second element.

5. A chuck as claimed in claim 3, wherein said structure includes a nut threaded onto said first element, and wherein is provided a gripping tube secured to said nut and surrounding the latter and said second element for effecting engagement of the clutch by rotation of said tube.

6. A chuck as claimed in claim 3, wherein is provided a resilient member interconnecting said structure and said first element to yieldably bias the structure out of said position.